United States Patent
Winkel et al.

(10) Patent No.: US 8,775,153 B2
(45) Date of Patent: *Jul. 8, 2014

(54) TRANSITIONING FROM SOURCE INSTRUCTION SET ARCHITECTURE (ISA) CODE TO TRANSLATED CODE IN A PARTIAL EMULATION ENVIRONMENT

(75) Inventors: Sebastian Winkel, Los Altos, CA (US); Koichi Yamada, Los Gatos, CA (US); Suresh Srinivas, Portland, OR (US); James E. Smith, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 1184 days.

This patent is subject to a terminal disclaimer.

(21) Appl. No.: 12/646,054

(22) Filed: Dec. 23, 2009

(65) Prior Publication Data
US 2011/0153307 A1 Jun. 23, 2011

(51) Int. Cl.
*G06F 9/445* (2006.01)
*G06F 9/30* (2006.01)
*G06F 12/08* (2006.01)

(52) U.S. Cl.
CPC .......... *G06F 9/3017* (2013.01); *G06F 12/0873* (2013.01); *G06F 12/0875* (2013.01)
USPC ............. 703/26; 711/113; 711/118; 711/125; 711/206

(58) Field of Classification Search
None
See application file for complete search history.

(56) References Cited

U.S. PATENT DOCUMENTS

| 5,345,576 | A | * | 9/1994 | Lee et al. ........................ 711/122 |
| 5,349,651 | A | * | 9/1994 | Hetherington et al. ........ 711/207 |
| 5,524,208 | A | * | 6/1996 | Finch et al. ...................... 714/25 |
| 5,752,272 | A | * | 5/1998 | Tanabe ........................... 711/171 |
| 5,826,089 | A | * | 10/1998 | Ireton ............................ 717/146 |
| 5,926,832 | A | | 7/1999 | Wing et al. |
| 6,615,340 | B1 | * | 9/2003 | Wilmot, II .................... 712/209 |
| 6,631,514 | B1 | * | 10/2003 | Le ................................. 717/137 |
| 7,111,096 | B1 | * | 9/2006 | Banning et al. ............... 710/100 |
| 7,269,825 | B1 | * | 9/2007 | Adcock ......................... 717/136 |
| 7,644,210 | B1 | * | 1/2010 | Banning et al. ............... 710/100 |
| 8,127,121 | B2 | * | 2/2012 | Yates et al. .................... 712/244 |
| 8,464,035 | B2 | * | 6/2013 | Dixon et al. ...................... 713/1 |
| 2002/0156977 | A1 | * | 10/2002 | Derrick et al. ................ 711/118 |

(Continued)

FOREIGN PATENT DOCUMENTS

EP 1316882 4/2003

OTHER PUBLICATIONS

Amit Vasudevan, et al., "Stealth Breakpoints," 2005, pp. 1-10.

(Continued)

*Primary Examiner* — Omar Fernandez Rivas
*Assistant Examiner* — Kibrom Gebresilassie
(74) *Attorney, Agent, or Firm* — Trop, Pruner & Hu, P.C.

(57) ABSTRACT

In one embodiment, a processor can operate in multiple modes, including a direct execution mode and an emulation execution mode. More specifically, the processor may operate in a partial emulation model in which source instruction set architecture (ISA) instructions are directly handled in the direct execution mode and translated code generated by an emulation engine is handled in the emulation execution mode. Embodiments may also provide for efficient transitions between the modes using information that can be stored in one or more storages of the processor and elsewhere in a system. Other embodiments are described and claimed.

24 Claims, 11 Drawing Sheets

(56) References Cited

U.S. PATENT DOCUMENTS

| | | | |
|---|---|---|---|
| 2005/0086451 A1* | 4/2005 | Yates et al. | 712/32 |
| 2005/0267996 A1* | 12/2005 | O'Connor et al. | 710/1 |
| 2007/0277021 A1* | 11/2007 | O'Connor et al. | 712/208 |
| 2007/0283100 A1* | 12/2007 | Asano et al. | 711/125 |
| 2007/0294702 A1* | 12/2007 | Melvin et al. | 718/104 |
| 2008/0270740 A1* | 10/2008 | Wang et al. | 711/206 |
| 2009/0031082 A1* | 1/2009 | Ford et al. | 711/128 |
| 2009/0204785 A1* | 8/2009 | Yates et al. | 711/205 |
| 2009/0228657 A1* | 9/2009 | Hagiwara | 711/129 |
| 2010/0050266 A1* | 2/2010 | Cheng et al. | 726/26 |
| 2010/0070708 A1* | 3/2010 | Maruyama | 711/118 |
| 2011/0055530 A1* | 3/2011 | Henry et al. | 712/244 |
| 2011/0154079 A1* | 6/2011 | Dixon et al. | 713/323 |
| 2011/0154090 A1* | 6/2011 | Dixon et al. | 713/502 |
| 2011/0225655 A1* | 9/2011 | Niemela et al. | 726/24 |
| 2012/0144167 A1* | 6/2012 | Yates et al. | 712/216 |
| 2013/0185580 A1* | 7/2013 | Dixon et al. | 713/323 |

OTHER PUBLICATIONS

Shiliang Hu, et al., "Reducing Startup Time in Co-Designed Virtual Machines," 2006, pp. 1-12.

Shiliang Hu, "Efficient Binary Translation in Co-Designed Virtual Machines," 2006, pp. 1-183.

Ho-Seop Kim, et al., "Hardware Support for Control Transfers in Code Caches," 2003, pp. 1-12.

Ho-Seop Kim, "A Co-Designed Virtual Machine for Instruction-Level Distributed Processing," 2004, pp. 1-205.

Jiwei Lu, et al., "Design and Implementation of a Lightweight Dynamic Optimization System," 2004, pp. 1-24.

Japanese Patent Office, Office Action mailed Dec. 4, 2012 in Japanese application No. 2010-262793.

* cited by examiner

TRANSITIONING FROM SOURCE INSTRUCTION SET ARCHITECTURE (ISA) CODE TO TRANSLATED CODE IN A PARTIAL EMULATION ENVIRONMENT

BACKGROUND

Modern microprocessors are at the heart of most computer systems. In general, these processors operate by receiving instructions and performing operations responsive to the instructions. For application programs and operating system (OS) activities, instructions may be received in a processor which then decodes these instructions into one or more smaller operations, often termed micro-instructions (uops), that are suitable for execution on the processor hardware. Some processors lack hardware features to directly perform certain instruction set architecture (ISA) instructions. It is for this reason that instructions are decoded into uops, which can be directly executed on the hardware.

An alternative implementation is to use a co-designed virtual machine (VM) where a layer of emulation software is designed in conjunction with the processor hardware. A co-designed VM implements a standard ISA referred to as a source ISA, for example the x86 ISA. Conventional software, including both the OS and application programs, is compiled to the source ISA. In turn, the hardware of a co-designed VM implements a target ISA designed specifically for a given hardware implementation with special performance and/or energy efficiency features. The target ISA is at the same level as uops and may be identical to the set of uops.

The emulation software belonging to the co-designed VM directs the execution of application/OS source ISA software either by interpreting it or by directly translating it into optimized sequences of target instructions. Such translation promises performance gains and/or improved energy efficiency.

The emulation process typically proceeds as follows. Interpretation is used for code (source ISA instructions) when it is first encountered. Then, as frequently executed code regions (hotspots) are discovered through dynamic profiling or some other means, they are translated to the target ISA. Optimization is often done as part of the translation process; code that is very heavily used may later be optimized even further. The translated regions of code are held in a translation cache so they can be re-used. The translation cache is managed by emulation software and is held in a section of memory that is concealed from all application/OS software. The application/OS software is held in conventional (visible) memory.

Previous processor implementations employing co-designed VMs employ full emulation, in which the emulation software emulates all application/OS software. One disadvantage of full emulation is that all code must first be interpreted and/or translated before it can be executed, and this may lead to low performance when a region of software is first encountered.

DETAILED DESCRIPTION

Figure 1:
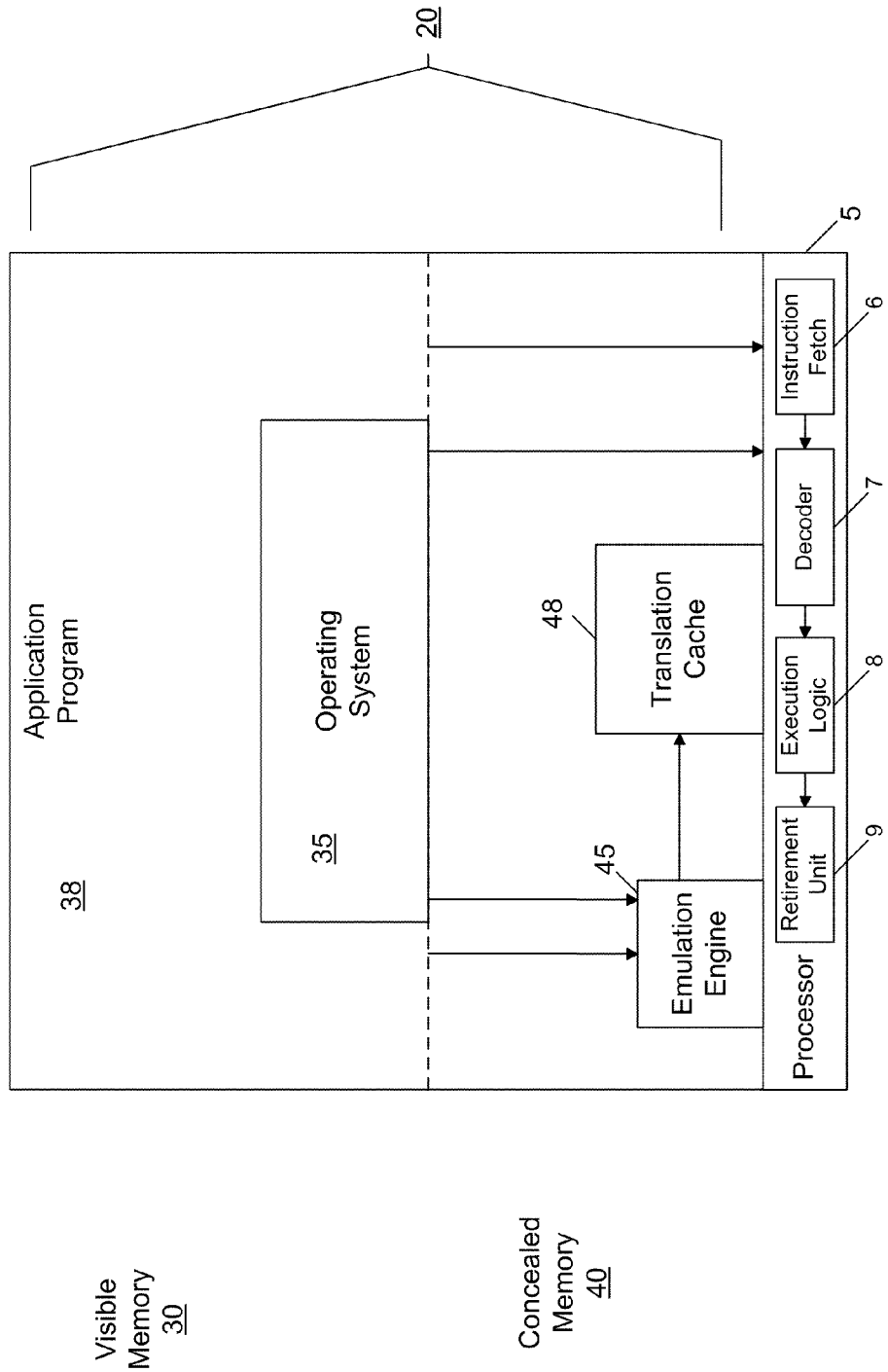
FIG. 1 is a block diagram of a co-design environment including a processor and a memory in accordance with one embodiment of the present invention.

In various embodiments, partial emulation can be implemented in a processor such as a co-designed microprocessor. To realize partial emulation, a processor can have two modes, a first mode where it directly executes instructions of a source ISA, which in one embodiment can be source ISA code (e.g., x86 code of an ISA for an Intel Architecture (IA)™ processor), and a second mode where it executes instructions of a target ISA (and which can be at uop level, bypassing the processor's instruction decoders), which can be translated and optimized code stored in a translation cache such as a code cache. As used herein, the first mode may be referred to as a "direct mode" or "direct execution mode" and the second mode is referred to as an "emulation mode" or "emulation execution mode."

Thus some portions of application/OS software may be fetched and executed directly via uops in the usual manner, while other portions of application/OS software are emulated via translation to the target instruction set. This process is referred to partial emulation. With partial emulation, software can first be directly executed with good performance, and then based on profiling information, selected frequently-executed regions are translated and stored in the translation cache. This approach has the benefit of avoiding performance losses when software is first encountered while providing performance and/or power efficiency gains for software that is frequently executed.

In order realize partial emulation, a mechanism may be provided for transferring control between direct execution of instructions held in conventional memory and emulation via translated instructions held in concealed memory. Transfer of control from emulation software to conventional application/OS software is achieved through branch and jump instructions executed by emulation software. Transfer of control from conventional software to translated code can be achieved by modifying the conventional software through "patching", or by placing branches or jumps in the conventional software. However, these modifications to conventional memory severely complicate the accurate emulation of the source ISA.

Embodiments provide for transferring from conventional software to emulation software that does not patch or modify the conventional application/OS software in any way. Rather, it uses a breakpoint mechanism in which hardware automatically detects a region of conventional software from which a transfer to emulation may be required. Then, via some combination of hardware and software, the emulation process effects the transfer to emulation code held in the translation cache.

During direct mode, when an instruction pointer (IP or EIP) is reached for which a translation exists, the processor may either switch to emulation execution mode and directly jump to the translation stored in the translation cache, or there may be a fast trap into the emulation engine. Then, the emulation engine can then look up the translation entry address via one or more tables, buffers, or caches, such as hash tables to accomplish the transition.

Different hardware implementations are possible. In one embodiment, a hardware technique to support fast original-to-emulation execution transitions may use a "source-IP to translated-IP" table. The emulation engine can store in such a structure source ISA code addresses and the corresponding translation addresses (target addresses) for its location in the translation cache. Such a table (and/or portions thereof) may be stored in different locations in various embodiments. The processor can then jump to the translation if the source IP matches a table entry. However, such a fully associative hardware structure may be far too small in size to handle the possibly thousands of paths from untranslated code into translated code. As such, this table can be used as a performance optimization, but not as a complete solution.

Because there are thousands of entry points into translations, embodiments may enable a fast transition into these translations whenever control reaches one of the entry points. Such transitions can be complicated because it is hard to predict which entry point will be reached next, as control flow is usually unpredictable over a long range. Embodiments thus determine whether there is a translation available for the current EIP, and if so how to find the entry address of this translation.

In one embodiment, a breakpoint cache can be implemented in hardware and a breakpoint table managed by the emulation engine. The emulation engine copies entries from the table to the cache as needed. A further embodiment can include breakpoint bits associated with instruction translation lookaside buffer (TLB) entries, with the emulation engine copying entries from the breakpoint table into the instruction TLB at the time instruction TLB entries are made. As an optimization, the breakpoint bit can be combined with an execute-only bit. Still further, breakpoint bits can be associated with instruction cache lines, with hardware copying entries from the breakpoint cache when new lines are brought into the instruction cache.

To further understand operation of various embodiments, it is instructive to illustrate components of a processor implemented as a co-designed virtual machine in accordance with an embodiment of the present invention. As shown in FIG. 1, a co-design environment 10 includes a processor 5 and a memory 20 which in one embodiment may be a system memory such as a dynamic random access memory (DRAM). As seen, processor 5 may have a given micro-architecture and may be coupled to memory 20 by way of, e.g., a point-to-point interconnect, bus or other such manner. In a visible portion of memory 20, namely a first portion 30, one or more operating systems 35 and application programs 38 may be stored. This portion is termed "visible" as it can be visible to user-level code (i.e., the application program 38) and visible to the OS (both OS 35 and program 38). Depending on the type of instructions to be executed in these programs, communication may be directly with processor 5, e.g., by way of using instruction decoders present in the processor to handle such instructions.

Alternately, for various code sequences that can be optimized using translated code or for such sequences in which micro-architecture support is not provided, embodiments may use a concealed portion of the memory, namely a second portion 40, in order to provide translated code to processor 5. Specifically, as seen, both OS 35 and application program 38 may communicate with an emulation engine 45, which may include a runtime execution unit including interpretation, translation and optimization mechanisms. Note that concealed memory 40 is not visible or accessible to the OS or application programs. Emulation engine 45 may thus provide code and address information to a translation cache 48, which may include translated code that can be provided to processor 5 for execution. In one embodiment, code stored in translation cache 48 may be encrypted. This translated code may be written and optimized for the underlying micro-architecture of the processor, e.g., target ISA code.

As seen, processor 5 which may be a co-design processor, includes front end units such as an instruction fetcher 6 that can receive instructions directly from the OS or application programs. These instructions, which may be macro-instructions, e.g., corresponding to user-level instructions of an application program can be decoded using a decoder 7, which may operate to decode the instruction and access corresponding uops, e.g., present in a microcode storage of processor 5. In turn, decoder 7 may provide the uops to one or more execution units 8, which may include various arithmetic logic units (ALUs), specialized hardware and other types of computation units. Results from these instructions may be provided to a retirement unit 9, which operates to retire the instructions to thus store the results to an architectural state of the processor in program order, if no fault or exceptions occurred. While described as an in-order machine, embodiments can equally be implemented using an out-of-order machine.

By using a partial emulation model such as shown in FIG. 1, in which source ISA code can be directly executed on the underlying hardware of processor 5, and providing emulation support for only a limited amount of code, e.g., so-called "hot" code, embodiments may provide for efficient operation. That is, because instructions can be directly executed in the underlying hardware, emulation is not on the critical path, and does not add to application startup latency. In this way, the overhead associated with both interpretation (which can have a very large overhead) and translation can be avoided. Instead translations are performed only for frequently executed code, and in some embodiments can occur in the background with a relatively low priority. After code translation to the target ISA is completed and stored in the translation cache (e.g., translation cache 48 of FIG. 1), execution of target ISA code can be done directly on the underlying hardware.

Still further, in certain instances, the emulation engine can back off and not perform translations. For example, for a difficult situation such as continuously self-modifying hot code, the emulation engine may choose not to translate such code to avoid the complexity involved in such translations. Similar decisions to not translate code occur for other complex features, such as a legacy real mode or ring 0 code. Instead, in various embodiments translation may be reserved for performance-critical user mode code, namely such code as has been determined to be hot code, e.g., by way of profiling information or so forth that indicates the frequent execution of the code.

In various embodiments, the emulation engine may perform a translation if the execution frequency of a given code segment meets a threshold level. As an example, a threshold may be set to initiate binary translations where the code has been executed at least a threshold number of times within a certain time period. Further by doing so, translation cache space requirements may be relatively small.

By using partial emulation in accordance with an embodiment of the present invention, instruction set extensions may be implemented efficiently without requiring redesign of underlying processor hardware. For example, consider graphics instructions that are added to an ISA as an extension. Frequent execution of the instructions can be dynamically translated and optimized in a fully transparent manner. If a given application does not include any such instructions, they will continue to run on the underlying hardware without any overhead. Still further, by using emulation in accordance with an embodiment of the present invention, fast emulation of new instructions that are not supported by an underlying micro-architecture can be realized.

In transferring control from source code in conventional memory to translated code in the translation cache, a basic assumption is that the emulation process never modifies instructions in conventional memory, e.g., by using patches. Because the source instruction space cannot be modified, hardware implemented breakpoints are provided which are used for marking source instruction regions for which translations exist in the translation cache. Then, during direct execution, if the flow of untranslated source instructions passes into a region of translated code, the breakpoint will force a transfer of control to the emulation engine which can then effect a transfer control to the proper target instruction in the translation cache.

Breakpoint indicators or bits are thus associated with addresses in conventional memory that hold source ISA instructions. The breakpoint bits can be assigned for specific byte addresses, or they can be assigned to addresses for larger regions, for example, 128 bytes. That is, there can be a single breakpoint bit for every 128 byte chunk of instruction memory. In one embodiment the chunk size is the same as the instruction cache line size.

Breakpoint bits are held in a breakpoint table that is stored in concealed memory and is maintained by emulation engine software. As such, the breakpoint table is a software data structure that can be implemented in a number of ways. For example, it could be a hash table. If any source instruction's IP value corresponds to an entry point for a region of translated code in the translation cache, then the breakpoint bit corresponding to the source instruction's chunk of memory is set to one.

If, during direct execution, instruction fetching branches or jumps to an instruction whose IP address is contained in a chunk of memory for which the breakpoint bit is set, there is an immediate transfer of control, or breakpoint trap, into the emulation engine.

After the trap to the emulation engine takes place, the emulation engine may use a map table that stores the mapping between source ISA instruction locations and corresponding translated code, if present. Thus the map table can be used to determine if a source instruction's IP value corresponds to a code region for which an entry point exists in the translation cache. If so, the emulation engine branches to entry point in the translation cache. If there is no such entry in the map table, then the emulation engine returns to the source ISA code at the IP value and hardware resumes direct execution. The reason a translation may not exist in the map table is that the breakpoint bits are at chunk granularity, and the IP values in a given chunk may correspond to multiple translation cache entry point addresses. There will be map table entries only for those IP addresses that actually correspond to entry points of translated code regions.

In various embodiments, a processor may include a hardware breakpoint cache to store the most recently used breakpoint table entries. As described earlier, entries in the breakpoint table are created by the emulation engine at the time code regions are translated and placed in the translation cache. The emulation engine may manage the contents of the breakpoint cache by copying breakpoint bits from the breakpoint table into the breakpoint cache when there is a miss in the breakpoint cache (and a micro-trap to the emulation engine).

Figure 2:
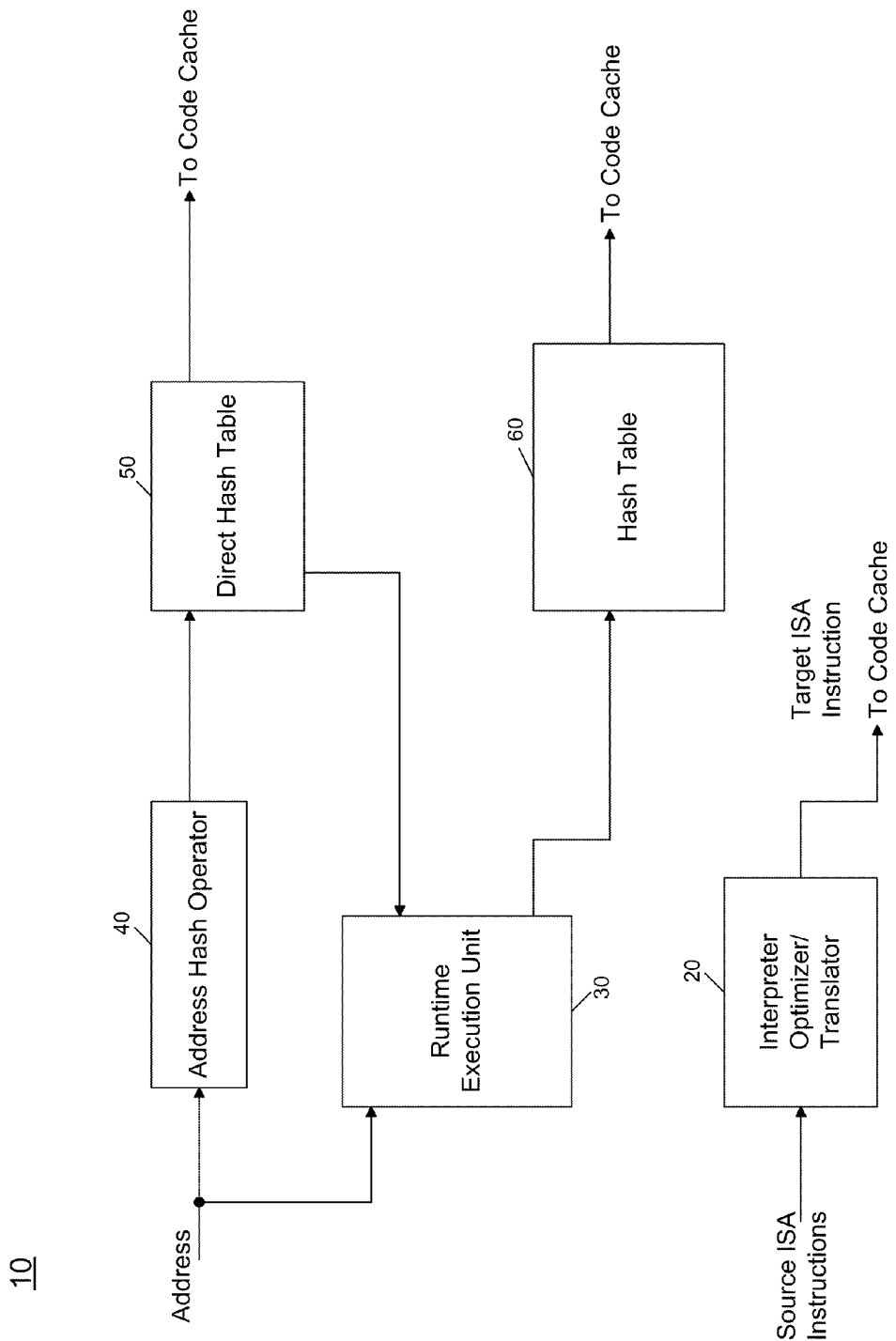
FIG. 2 is a block diagram of components of an emulation engine in accordance with one embodiment of the present invention.

Different implementations are possible and will be described with reference to the various figures described below. Referring now to FIG. 2, an emulation engine 10, which may be stored in a concealed memory such as a concealed portion of system memory hidden from access by both user level applications and system software, may include various components. Specifically, as seen in FIG. 2, emulation engine 10 may include an interpreter/translator/optimizer (generally translator) 20 which may be configured to receive incoming source ISA instructions of a given processor type (such as an x86 processor). Translator 20 may first generate interpreted instructions for newly encountered source ISA instructions. Then when it is determined that such instructions may be frequently executed, translator 20 operates to translate these instructions into translated code, i.e., target ISA instructions, which may be optimized for various micro-architectural features of the processor, and thus operates in a build mode in which the translated code is generated. Of course, in addition to the instructions, various information may also be provided to translator 20 including, for example, profiling information, threshold and other control information, and so forth to aid in the optimization and translation of the ISA instructions. The output of translator 20 is thus translated code which may be target ISA instructions, e.g., in the form of optimized uops. This code is provided to and stored in a code cache (also referred to as a translation cache), which in one embodiment may also be present in a concealed portion of system memory.

Emulation engine 10 may receive information during code execution. When it is determined that an address to be accessed (e.g., a code address) is indicated to be emulation engine-controlled, the address is provided to an address hash operator 40, which may perform a hash on the address to thus output a hash value to a direct hash table 50, which may be a hash table stored in the concealed memory. This jump from the address hash operator to the direct hash table may represent a jump of the processor control flow into the translated code. A given entry of direct hash table 50 will be accessed using the hash value, and if valid information for the corresponding address is present in the entry, translated code execution may immediately begin using the code stored in direct hash table 50. At the conclusion of the entry, a jump to further translated code may send control to the code cache to access the further translated code.

It is also possible that valid translated code for a given address is not present in direct hash table 50. Accordingly, a signal to cause a jump in the processor control flow may be sent to runtime execution unit 30 to indicate this condition so that the unit may determine a location of the corresponding translated code using information stored in a hash table 60, which may be a complete hash table for all translated code entry points. This hash table may be stored in another portion of concealed memory. On a hit in this memory, the address may be sent to the code cache to begin execution of the translated code. While shown with this particular embodiment in the implementation of FIG. 2, understand the scope of the present invention is not limited in this regard. For example, instead of hash tables, other structures that are accessed without hashing may be implemented, as will be discussed below.

Figure 3:
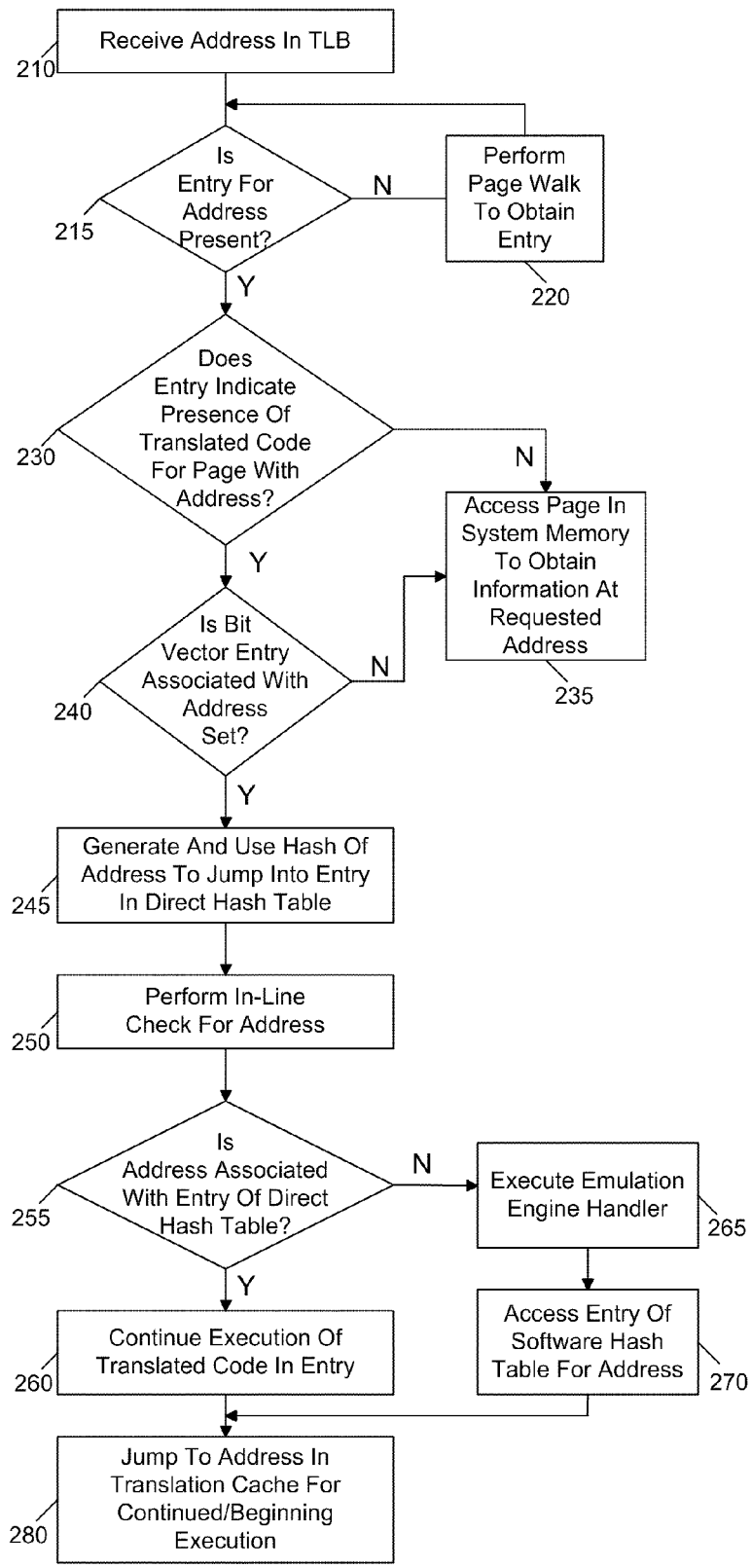
FIG. 3 is a flow diagram of a method in accordance with one embodiment of the present invention.

In another embodiment, a breakpoint cache may be integrated with an instruction translation lookaside buffer (iTLB). Using an emulation engine in accordance with an embodiment of the present invention, smooth transitions from execution of original code into execution of translated code may occur. Referring now to FIG. 3, shown is a flow diagram of a method in accordance with one embodiment of the present invention. As shown in FIG. 3, method 200 may be used to determine if a translation exists for a given address and if so, to determine the location of the translation. As seen, method 200 may begin by receiving an address in a memory management unit structure such as in a TLB, e.g., an iTLB (block 210). Next, it may be determined whether an entry for this address is present (diamond 215). If not, a page walk may be performed to obtain an entry for the corresponding page including the address (block 220).

Then when an entry is present in the iTLB, it may be determined whether the corresponding entry indicates the presence of translated code within the page that includes the address (diamond 230). As will be described, different manners of making this determination may be performed. If translated code is not indicated, then a normal memory access may occur and a requested page may be accessed, e.g., in system memory to obtain the information at the requested address (block 235).

If instead at diamond 230 it is determined that translated code is present for a location within the page, control passes to diamond 240. The determination at diamond 240 may be used to provide finer-grained analysis of emulation engine-controlled indications. Specifically, at diamond 240 it may be determined whether a bit vector entry associated with the address is set. If not, control passes back to block 235 as discussed above for a conventional memory access. When set, the bit vector entry indicates that a chunk, e.g., a 128 byte (B) chunk, including the corresponding address includes translated code. Accordingly, control passes to block 245.

At block 245, a hash of the address may be used to jump into an entry in a direct hash table. As will be discussed further below, this direct hash table may be present in a concealed memory. More specifically, a given entry of the direct hash table corresponding to the address hash may be accessed. Due to limitations on the size of the direct hash table, multiple addresses may be associated with a single entry in this table such that the code for this address may not be present in the entry. Accordingly, embodiments may perform an in-line check for the address using information present in the accessed entry (block 250). From this check it may be determined whether the address is associated with the entry (diamond 255). If not, control may pass to an emulation engine handler (block 265) which in turn accesses a software hash table that is a complete hash table storing mappings of all translations present in the translation cache. Accordingly, at block 270 an entry of the software hash table may be accessed based on the address.

Referring still to FIG. 3, if a corresponding entry of the direct hash table is associated with the address hash, control passes from diamond 255 to block 260, where execution of the translated code may continue directly in the entry, which includes at least some amount of the translated code. At the end of the entry, a jump may be made to an address in the translation cache for continued code execution (block 280). Note that block 280 may also be entered from block 270 to begin translated code execution using the address in the translation cache obtained from the complete software hash table. While shown with this particular implementation in the embodiment of FIG. 3, the scope of the present invention is not limited in this regard.

Embodiments may leverage existing memory protection mechanisms in order to allow the emulation engine to gain control at page granularity. In one embodiment, an additional indicator (e.g., a single bit) may be stored with each entry of a processor structure such as an instruction cache or iTLB to indicate whether the page is emulation engine-controlled (e.g., includes code having corresponding translated code in the translation code) or not. This bit is managed by the emulation engine and is not part of the externally visible system architecture. In some embodiments, the emulation engine-controlled bit can be combined with an execute-disable (XD) bit in hardware. In other words, in such implementations, a single bit present in TLB entries can be used to indicate presence of both translated code and execute-disable pages. In this case, the emulation engine intercepts all resulting faults and determines whether they are real (a very rare exception) or not; only in the former case it would raise the corresponding fault to the appropriate fault handler of the target ISA code. Extensions may also provide for more fine-grained execution control by way of a bit vector as described below.

Figure 4A:
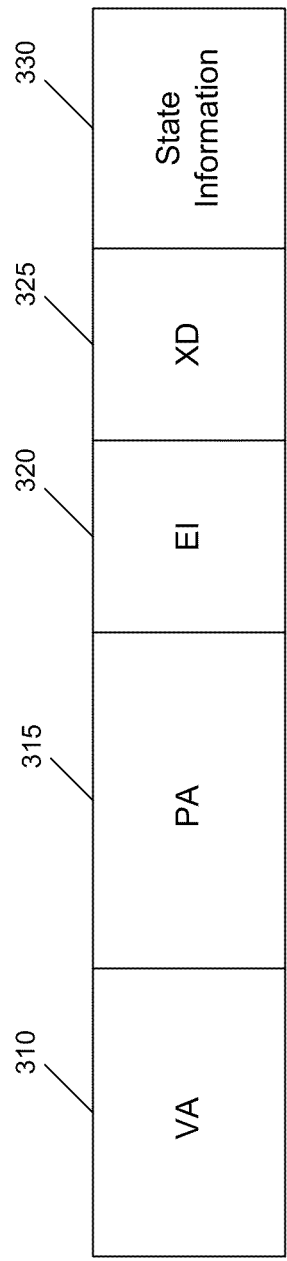
FIG. 4A is an illustration of a translation lookaside buffer (TLB) entry in accordance with one embodiment of the present invention.
Figure 4B:
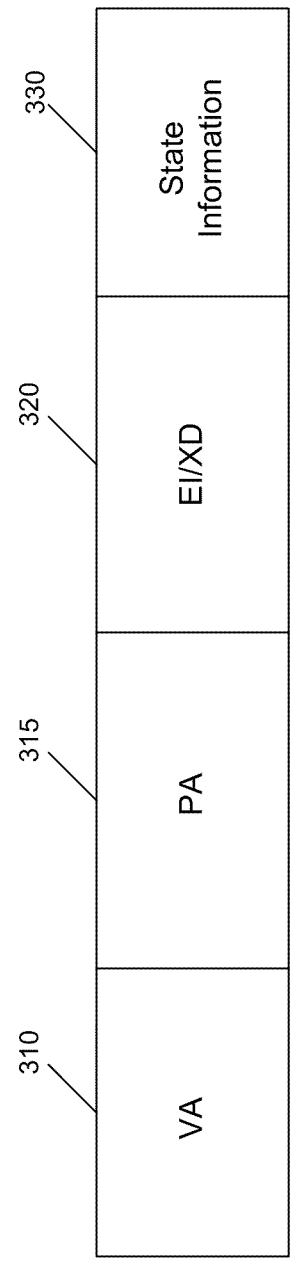
FIG. 4B shows an alternate TLB entry in accordance with another embodiment of the present invention.

Referring now to FIG. 4A, shown is an illustration of a TLB entry in accordance with one embodiment of the present invention. As shown in FIG. 4A, entry 305 includes various fields including a virtual address (VA) field 310 to store a VA, a physical address (PA) field 315 to store a PA, an emulation indicator field 320 which may store, e.g., a single bit, to indicate whether the corresponding page identified by the address stored in PA field 315 includes any code having translated code stored in the translation cache. In addition, as shown in FIG. 4A, an XD field 325 may store, e.g., a single bit to indicate whether the corresponding page includes execute disable information. In addition, a state field 330 may include various state information such as attribute information or so forth. FIG. 4B shows an alternate TLB entry in accordance with another implementation in which the emulation indicator can be combined with the XD indicator, thus reducing space requirements.

When a processor fetches instructions from an emulation engine-controlled page in direct mode, there is a fast trap into the emulation engine, which can then retrieve an available translation and jump to it. For efficiency this re-steer into the emulation engine trap handler may occur quickly, e.g., faster than a conventional exception, which can take hundreds of cycles to process. This is so, as a processor can determine early in the front-end of a processor pipeline, e.g., via the iTLB access, whether the accessed code page has the emulation engine-controlled bit set. The re-steer into the emulation engine trap handler can therefore occur early, without disrupting the pipeline back-end and without waiting for retirement of the code up to the branch that triggered the trap. Ideally, the re-steer may cost only a few pipeline bubbles or is even made subject to branch prediction.

In partial-translation implementations, the emulation engine only translates from the hottest code pages, e.g., the hottest 5% or 10%, which will cover most of the hot spots unless the execution profile is very flat. Potential inefficiencies due to the low granularity of page-level emulation engine control can occur. If the locality of hot code is low, it can happen that code with low repeat rates is translated just because it happens to be on the same page as hot code, although it would be more efficient to just execute such code in direct mode. Two approaches may reduce this overhead. First, the emulation engine can generate ultra-lightweight translations for code that is on an emulation engine-controlled page but has a low repeat rate. For example, the emulation engine can quickly replace the original code 1:1 with the corresponding uop sequences without doing expensive data flow analyses or optimizations. Still further, instrumentation for hot-spot profiling can be added on the fly.

Second, the emulation engine can use additional hardware support for more fine-grained emulation control. In one embodiment, for each code page, the emulation engine can maintain a storage unit such as a bit vector to specify emulation engine control for sub-regions of a page indicated to include emulation engine code. For example, there can be a 32-bit vector per 4 kilobyte (K) code page that specifies whether emulation control is desired for each 128 byte (B) chunk on the page. The bits of the vector can be set for all chunks for which translations exist and cleared otherwise. In direct mode, the processor traps into the emulation engine only if the IP reaches a chunk for which the bit is set. This hardware feature may be especially useful if only a few chunks of a code page contain hot translated code and the rest is relatively cold. Then only these chunks trigger the emulation control and emulation execution, and the rest of the chunks continue to execute in direct mode with no additional overhead.

In one embodiment, the bit vectors can be made part of the iTLB entries, such as added to the state fields shown in FIGS. 4A and 4B. Thus as an example, each entry of the TLB can be extended with a bit vector for the corresponding page. Alternatively, a small direct-mapped cache structure can be used. This cache can then be accessed in addition to the iTLB, which includes a single "emulation engine-controlled" bit per page, as shown in FIGS. 4A and 4B. If a TLB entry for a page with a set "emulation engine-controlled" bit is accessed in the direct mode, but at the same time a bit vector entry in the cache exists in which the bit corresponding to the accessed chunk is not set, then the trap into the emulation engine can be suppressed.

Figure 5:
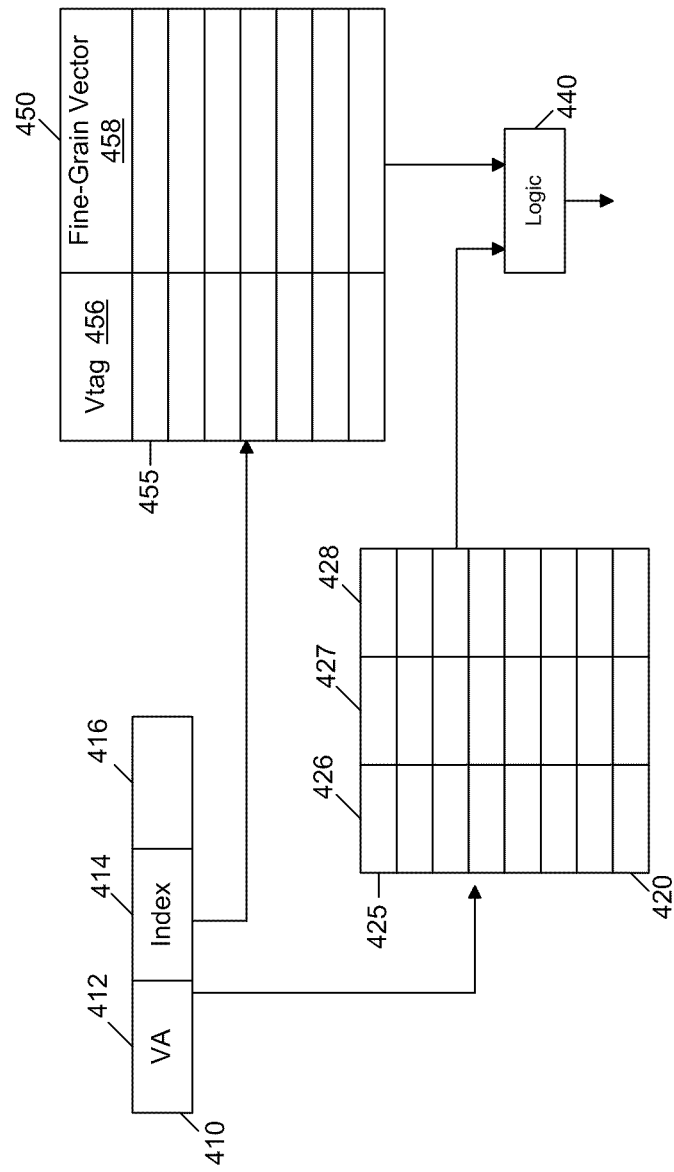
FIG. 5 is a block diagram of a bit vector structure and a TLB in accordance with one embodiment of the present invention.

Referring now to FIG. 5, shown is a block diagram of an implementation in which a bit vector structure is separate from a TLB. As seen in FIG. 5, an incoming address 410, e.g., an IP value may include various portions, including a most significant portion 412, an index portion 414, and a least significant portion 416. As seen, most significant portion 412 may correspond to a virtual address that is provided to an iTLB 420 which includes various entries to associate such a virtual address with a corresponding physical address. In the embodiment of FIG. 5, each cache entry 425 of iTLB 420 includes a VA field 426, a PA field 427, and an emulation indicator field 428. Of course, other fields such as a state field may be present in some embodiments. As seen, the corresponding emulation indicator from indicator field 428 may be provided to a control logic 440. As further seen in FIG. 5, the index portion 414 of the address 410 is provided to a cache memory 450, which may be a small separate cache that is accessed in parallel with iTLB 420. As seen, each entry 455 of cache 450 may include a tag portion 456 which is used to determine whether index portion 414 matches a corresponding entry. Each entry 455 further includes a vector portion 458, which may include N bits, with each bit corresponding to a portion of a memory page. For example, a 32-bit vector may thus associate 128B chunks with each corresponding bit. When set, the bit indicates that the corresponding chunk of the page includes translated code and when cleared, no such translated code is present. Using the index provided, a corresponding entry is accessed and the given bit of vector 458 is output to logic 440, which may perform a logic operation using the emulation indicator from iTLB 420 and the output of vector 458. In one embodiment, logic 440 may operate in accordance with Table 1 below to determine whether to give the emulation engine control for the corresponding chunk.

TABLE 1

| Emulation Indicator From iTLB | Bit From Bit Grain Vector | Result |
| --- | --- | --- |
| 1 | Miss | Yes |
| 1 | 1 | Yes |
| 1 | 0 | No |
| 0 | — | No |

The output from control logic 440 may cause different actions to occur. In one embodiment, an active control signal from control logic 440 indicates the presence of translated code, which can cause the IP to be hashed and provided to a direct hash table to begin execution if a corresponding entry is present. Or, processor control flow may directly jump to the emulation engine, e.g., an emulation engine handler.

In various embodiments, cache 450 does not require expensive hardware management, and can be filled by the emulation engine. Whenever there is a trap into the emulation engine and there is no translation available for the current chunk of the emulation controlled page, then the trap handler can insert a bit vector entry 455 for this chunk into cache 450 to prevent further unnecessary traps. Depending on the implementation trade-offs in one embodiment, a shared hardware structure can be read for both "execute protection" and "write protection" (which may be aliased with the bit vector field, or included as a separate field) or separate structures of similar design can be implemented.

After determining whether there is a translation available for the current EIP, a fast hardware technique can be used to find the entry address of this translation. As described, there can be a trap into the emulation engine, which allows the emulation engine to look up the translation entry address in a software hash table. This process naturally takes from a few dozen up to hundreds of cycles.

Figure 6:
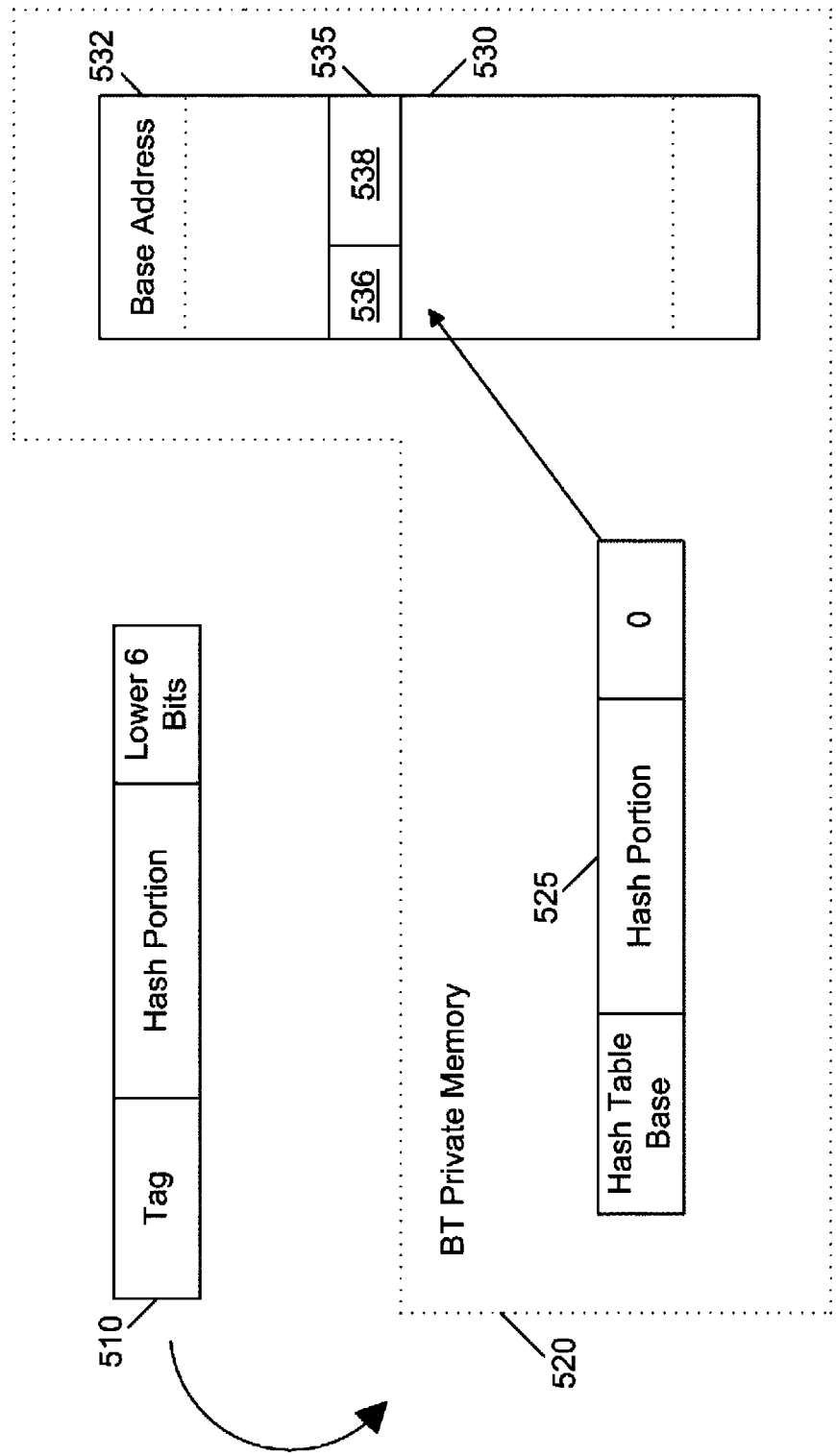
FIG. 6 is a block diagram of a direct hash operation to access a direct hash table in accordance with one embodiment of the present invention.

For faster translations, in some embodiments the processor may directly jump into the translation cache instead of the emulation engine when the iTLB triggers a direct mode-to-emulation execution transition. The target address can be generated by hardware using the current IP via direct hashing. In one embodiment an address (e.g., corresponding to an EIP value) can be hashed to obtain an index into a direct hash table. As seen in FIG. 6, a least significant portion of an address 510 (e.g., the lower six bits) are cleared and the upper N bits are replaced with a base address of a direct hash table 530, which in one embodiment may be stored in private memory 520 of the emulation engine. Then, the mid-portion of the address (e.g., bits 6 (63-N)) is the hash portion and remains unchanged, thus generating a hash value 525. In this way, each 64-bit EIP maps into a hash table of size $2^{64-N}$. In one embodiment, each entry may be of a cache line width (e.g., 64 B). As seen in FIG. 6, direct hash table 530 may begin at a base address 532 that corresponds to the most significant bits, i.e., the hash table base present in address hash value 525.

Each valid entry of this hash table contains the beginning of a translation, i.e., the processor switches to emulation execution mode as it jumps into the table and immediately starts to execute the translation code there. However, since multiple EIPs can map to each hash table entry, it is possible that the stored translation does not match the last original EIP. Therefore in one embodiment, a check can be in-lined into the entry that asserts that the last original EIP, as well as any other relevant original context, matches that for which this translation was generated. If this assertion fails, there is a trap into the emulation engine, which can then look up the correct translation entry point in its complete hash table. As shown in FIG. 6, each entry 535 may include a check portion 536 and a translation portion 538, which may be the beginning of the translated code for the corresponding address. At the end of translation portion 538, a jump to additional translated code present in the translation cache may be present.

That is, translations are almost always larger than a cache line and therefore may not be fully included in the hash table entry. In one embodiment, an unconditional branch may be provided at the end of each entry to jump to the remainder of the translation outside of the hash table (e.g., stored in the translation cache). As described above, hash table 530 is maintained by the emulation engine's translation cache management component. Empty entries in the hash table may contain an instruction that directly jumps into the emulation engine. Direct hashing reduces the transition overhead from direct mode to emulation execution mode almost to zero for those translations that are included in the hash table (for the remaining ones there is still the software hash table as described above in FIGS. 2-3).

Note that original-mode-to-emulation execution transitions are typically not "hot-to-hot", but rather "cold-to-hot." For "hot-to-hot code" transitions, chaining may be used, i.e., direct branching between translations. However, in applications with a flat profile where a lot of code has execution frequencies close to the translation threshold, original-mode-to-emulation execution transitions can be relatively frequent. Direct hashing enables a partial-translation model to perform well on such workloads.

In some implementations, direct hashing can also be used to speed up execution of indirect branches in emulation execution mode. In this way, a software handler to look up the translation address corresponding to the original target address of an indirect branch can be avoided, as these lookups represent one of the most significant categories of runtime overhead. To reduce this overhead significantly, embodiments may store translation basic blocks that are frequent targets of indirect branches into the hash table. For the corresponding indirect branches, special branch instructions can be used to directly jump to the hash table entry corresponding to the original target address. In some embodiments, separate hash tables can be used for different groups of indirect branches, and parameters such as the entry sizes can be varied.

Figure 7:
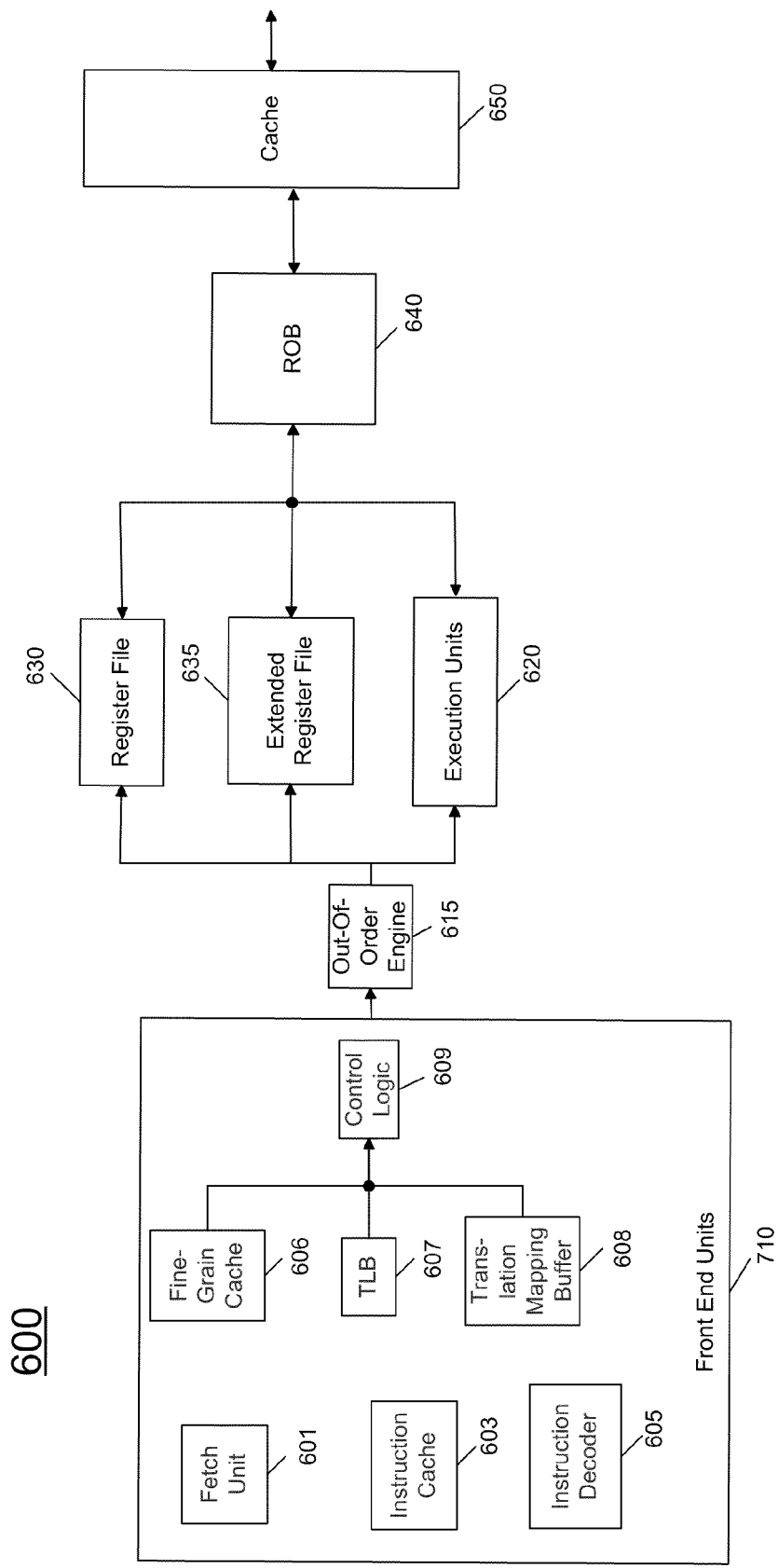
FIG. 7 is a block diagram of a processor in accordance with one embodiment of the present invention.

Referring now to FIG. 7, shown is a block diagram of a processor in accordance with one embodiment of the present invention. As shown in FIG. 7, processor 600 may be a multi-stage pipelined out-of-order processor. Processor 600 is shown with a relatively simplified view in FIG. 7 to illustrate various features used for transitioning between an original execution mode and a translation execution mode in accordance with one embodiment of the present invention.

As shown in FIG. 7, processor 600 includes front end units 610, which may be used to fetch macro-instructions to be executed and prepare them for use later in the processor. For example, front end units 610 may include a fetch unit 601, an instruction cache 603, and an instruction decoder 605. In some implementations, front end units 610 may further include a trace cache, along with microcode storage as well as a micro-operation storage. Fetch unit 601 may fetch macro-instructions, e.g., from memory or instruction cache 604, and feed them to instruction decoder 605 to decode them into primitives, i.e., micro-operations for execution by the processor.

Front end units 610 further include various structures such as cache memories or buffers that can be used to store translation information to aid in determining whether a requested address may have translated code associated with it. Specifically, these structures may include a fine-grain cache 606, a TLB 607, and a translation mapping buffer 608. In one embodiment, cache 606 may be a relatively small cache memory that can be configured such as the cache memory 450 shown in FIG. 5. Thus this cache memory may store a plurality of entries each to store at least one bit vector that provides a mapping by way of indicators for subsets of a given memory page to indicate whether the corresponding subset has translated code associated with it. TLB 607 may have entries to store translations between VAs and PAs, in addition to at least one indicator to indicate whether the corresponding memory page includes translated code. In turn, translation mapping buffer 608 may include a plurality of entries. This buffer may be relatively small and may include a direct mapping between, e.g., a virtual address and a corresponding address in a translation cache. This buffer may provide the fastest route to translated code. However, due to its small size, the buffer may not include a desired translation. While the scope of the present invention is not limited in this regard, entries in mapping buffer 608 may be evicted according to a least recently used (LRU) algorithm such that the most recently used (and/or most frequently used) translations can be stored in the buffer.

In one embodiment, each of cache 606, TLB 607 and mapping buffer 608 may be accessed in parallel using at least a portion of a virtual address. However, in some embodiments, mapping buffer 608 may be first accessed such that if a translation is present, the overhead of accessing the TLB 607 and cache 606 can be avoided. The corresponding outputs of these storage structures, which may correspond to hit information or an indication of a miss, may be provided to a control logic 609. Based on one or more of the outputs of these storages provided to control logic 609, a determination may be made whether a corresponding address includes translated code. If so, the logic possibly may also determine a location of the translated code (if a hit occurs in mapping buffer 608). Accordingly, control logic 609 may enable a fast transition from original mode to trex mode.

Referring still to FIG. 7, coupled between front end units 610 and execution units 620 is an out-of-order (OOO) engine 615 that may be used to receive the micro-instructions and prepare them for execution. More specifically OOO engine 615 may include various buffers to re-order micro-instruction flow and allocate various resources needed for execution, as well as to provide renaming of logical registers onto storage locations within various register files such as register file 630 and extended register file 635. Register file 630 may include separate register files for integer and floating point operations. Extended register file 635 may provide storage for vector-sized units, e.g., 256 or 512 bits per register.

Various resources may be present in execution units 620, including, for example, various integer, floating point, and single instruction multiple data (SIMD) logic units, among other specialized hardware. Results may be provided to retirement logic, namely a reorder buffer (ROB) 640. More specifically, ROB 640 may include various arrays and logic to receive information associated with instructions that are executed. This information is then examined by ROB 640 to determine whether the instructions can be validly retired and result data committed to the architectural state of the processor, or whether one or more exceptions occurred that prevent a proper retirement of the instructions. Of course, ROB 640 may handle other operations associated with retirement.

As shown in FIG. 7, ROB 640 is coupled to a cache 650 which, in one embodiment may be a low level cache (e.g., an L1 cache) although the scope of the present invention is not limited in this regard. Also, execution units 620 can be directly coupled to cache 650. From cache 650, data communication may occur with higher level caches, system memory and so forth. While shown with this high level in the embodiment of FIG. 7, understand the scope of the present invention is not limited in this regard.

Embodiments thus enable partial emulation without any patching of original code, which can add additional complexity and potentially a large performance overhead. Further, existing memory protection mechanisms can be used to provide an emulation engine with execution control on a page and/or finer-grained (e.g., 128B) chunk level. Further, to reduce the latency of control transitions, direct hashing may be used. Still further, an "IA-IP to translated-IP" hardware structure can be used either additionally or alternatively to direct hashing to allow very low latency for a small subset of transitions.

In yet other implementations, different hardware configurations can be used to realize efficient direct mode to emulation execution mode transfers. With partial emulation, source ISA code can be executed directly from conventional memory. Direct execution of unmodified source ISA code means that the emulation engine does not have an opportunity to inspect all source ISA instructions before they are emulated. Furthermore, the execution engine cannot track their execution control flow directly (as with interpretation) or indirectly (through linkages placed in translated code). As such, prior to translation, source ISA instructions (and code regions) that should be translated and/or optimized can be identified. Also, after instructions have been translated, a mechanism may be provided to transfer control between source ISA instructions in the conventional memory and target ISA instructions in the code cache as instruction execution proceeds.

This is done as each instruction is interpreted and/or at the time instructions are translated. As they are inspected, certain opcodes can be identified for special software emulation, or profiling data can be collected to identify hotspots. In one embodiment, micro-traps may provide a mechanism to enable the emulation engine to inspect all source ISA code before it is emulated. These are lightweight traps that transfer control directly to the emulation engine. To minimize their overhead, no registers are saved automatically, and control is vectored to a specific location depending on the cause of the trap. Micro-traps can be triggered by selected opcodes or by a micro-timer, in different embodiments.

By selecting unimplemented opcodes for triggering a micro-trap, the emulation engine immediately gains control when one of the opcodes is encountered. Then, it can either interpret the instruction, or if the instruction belongs to a heavily executed code region, it can translate and cache the code region for higher performance emulation. Because unimplemented instructions may tend to cluster together (e.g., for graphics), a single translated region may contain several unimplemented instructions.

To detect hot regions containing unimplemented opcodes, the emulation engine can simply count the number of times that specific instructions trigger a micro-trap. These counts can be maintained in a profile table, and the accumulated profile information can be used for guiding translation and optimization decisions.

If partial emulation is also being used for optimizing hotspot code regions, regardless of whether they contain unimplemented instructions, then a micro-timer and associated micro-trap can be used to assist with hotspot detection through profiling. In one embodiment, the micro-timer is set by the emulation engine, and it decrements every clock cycle. When the micro-timer count reaches zero, it waits for the next branch/jump instruction and immediately traps to a pre-defined location in the emulation engine (i.e., a micro-trap). At that point, the emulation engine has an opportunity to collect profile data. It can either create a new profile entry for the destination of the branch/jump at the location of the trap. Or, it can update a profile entry if the same branch/jump has been previously encountered. Branches and jumps are singled out because most binary translators begin translation regions at basic block boundaries.

A transfer of control from conventional memory to a translated code region in the code cache may have fairly high overhead in terms of clock cycles. To reduce the overhead, some embodiments may provide a so-called jump TLB which is a cache-like structure that contains recently used map table entries. It can be accessed from the instruction pipeline and its contents are managed by the emulation engine. During the time intervals when source instructions are being executed directly from conventional memory, all branch and jump destination addresses index into the jump TLB. If there is a hit in an entry of the jump TLB, the entry provides the destination address in the code cache, and instruction fetch hardware immediately transfers control to that address. In one embodiment, emulation software manages the jump TLB by copying map table entries into the jump TLB as needed, replacing less recently used entries.

In one embodiment, the breakpoint mechanism and jump TLB can work together. After a block of code has been translated by the emulation engine, the emulation engine will set a breakpoint bit in the breakpoint table corresponding to the first line of the translated source instructions. It also makes an entry in the map table. During direct execution of source code there are a number of cases that can occur when a branch or jump is encountered. First, the destination address may have its breakpoint bit set, but there is a miss in the jump TLB. In this case, there is a trap to the emulation engine, which checks the map table. If there is an entry in the map table, the emulation engine will place it in the jump TLB, e.g., replacing a least recently used entry. Then it will transfer control to the code cache.

The second situation is a hit in the jump TLB, and the breakpoint bit is set. In this case, the transfer will happen immediately according to the contents of the jump TLB entry without a breakpoint micro-trap. To facilitate this function, the jump TLB entries may include a breakpoint override flag to allow the branch/jump to continue regardless of the state of the breakpoint bit.

The third situation is a jump TLB miss when the breakpoint bit is cleared to zero. In this case, no micro-trap takes place and direct execution from conventional memory continues uninterrupted. A final case is a hit in the jump TLB and the breakpoint bit is zero. This situation should not occur while performing direct execution if the jump TLB and breakpoint bits are used as just described. However, this case can occur if the jump TLB is used for transferring control from one translated region in the code cache to another.

Figure 8:
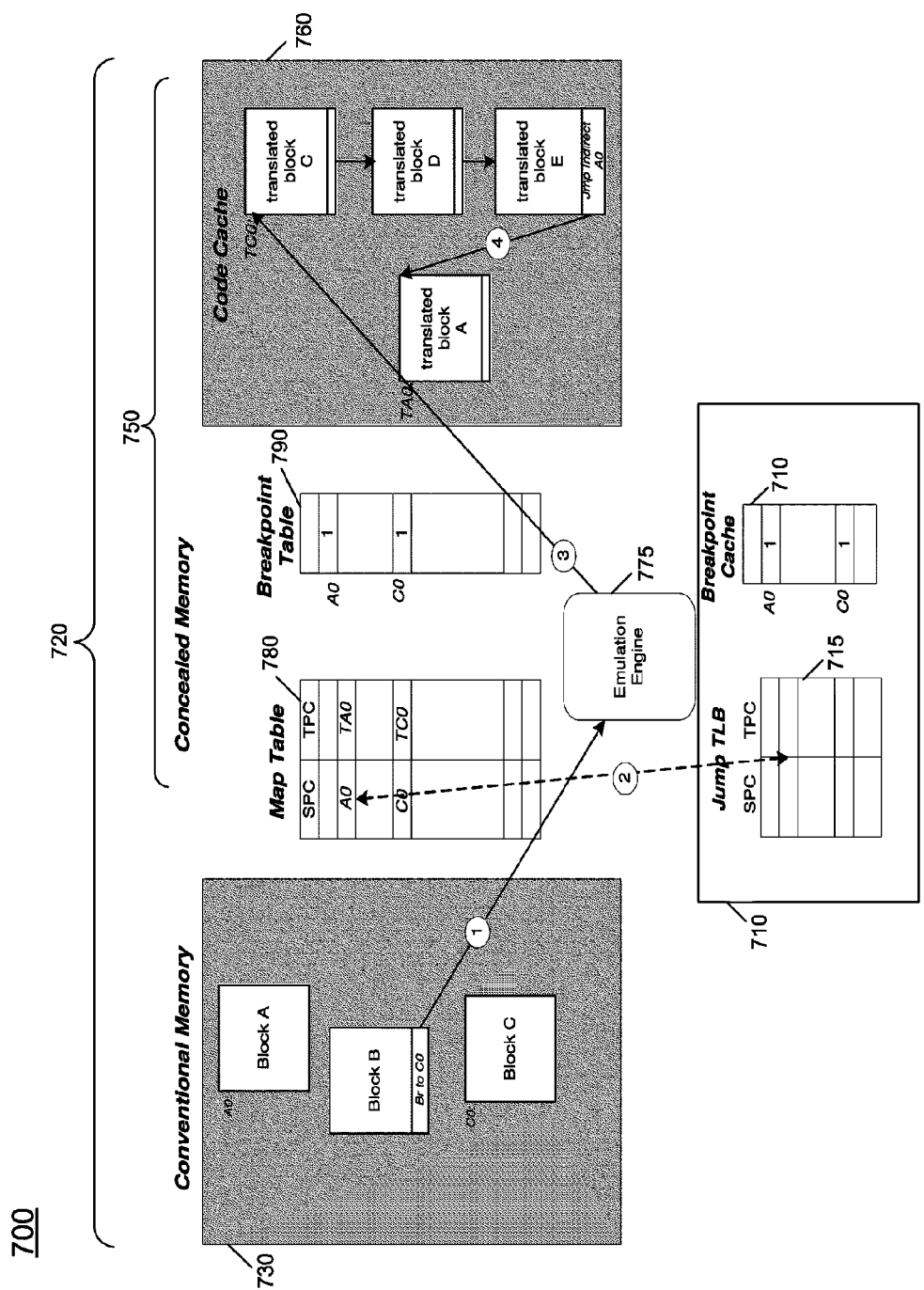
FIG. 8 is a block diagram showing operation in accordance with one embodiment of the present invention.

Referring now to FIG. 8, shown is a block diagram showing operation in accordance with one embodiment of the present invention. The combined operation of the jump TLB and breakpoint cache are illustrated in FIG. 8. As seen, system 700 includes a processor 710 which may include one or more cores. Details of the processor are not shown, other than various storages that may be used to handle jumps or transitions between direct execution code and translated execution code. As seen, these structures may include a breakpoint cache 710 which in various embodiments may include entries having a single bit per line of an instruction cache or other instruction storage. In addition, a mapping cache, namely, a jump TLB 715 may be provided that can store recently accessed translations between a source program counter (SPC) and a target program counter (TPC). Of course additional logic may be provided within processor 710. During operation processor 710 may communicate with a memory 720, which in one embodiment may be a system memory that includes a conventional memory portion 730 and a concealed memory portion 750. As seen, conventional memory portion 730 may include various source ISA code blocks, namely blocks A-C. Translated code blocks may be present in a code cache 760 for at least some of these blocks. To determine whether valid translated code is present, access may be made by an emulation engine 775 to various structures, including a map table 780, which may be a full table including translations between source program counters and target program counters. In addition, a breakpoint table 790 may include a full set of breakpoint bits.

For discussion, assume that instructions in Block B are executing directly from conventional memory 730. At the end of the block there is a branch to source code destination C0 of Block C. Block C has been translated and is stored in code cache 760 of concealed memory 750, but the mapping is not currently in jump TLB 715. This causes a breakpoint trap to emulation engine 775 (action (1) in FIG. 8) because the breakpoint bit in breakpoint cache 710 is set. Emulation engine 775 accesses map table 780, finds the mapping, and installs it into jump TLB 715 (action (2) in FIG. 8). Then, emulation engine 775 jumps to the translated code for Block C (action (3)). The next time the branch from source Block B to C occurs, there will be a jump TLB hit and the transfer will occur immediately, without software intervention (assuming that the jump TLB entry has not been replaced).

Continuing with the example, after translated blocks C, D, and E have executed from code cache 760, there is a jump indirect to code Block A. In this case, the destination is a source code address, which will be intercepted by jump TLB 715, and control will transfer immediately to the translated Block A. When using a jump TLB a transfer of control to the translated code may occur regardless of which originating branch or jump hits in the TLB. This means that if there are a number of different instructions that all jump to the same translated code, then the register assignments and other architected state in the translated destination block should be consistent with respect to all the "come-from" blocks. To handle this, the jump TLB may include additional field(s) to select originating branch/jumps.

Figure 9:
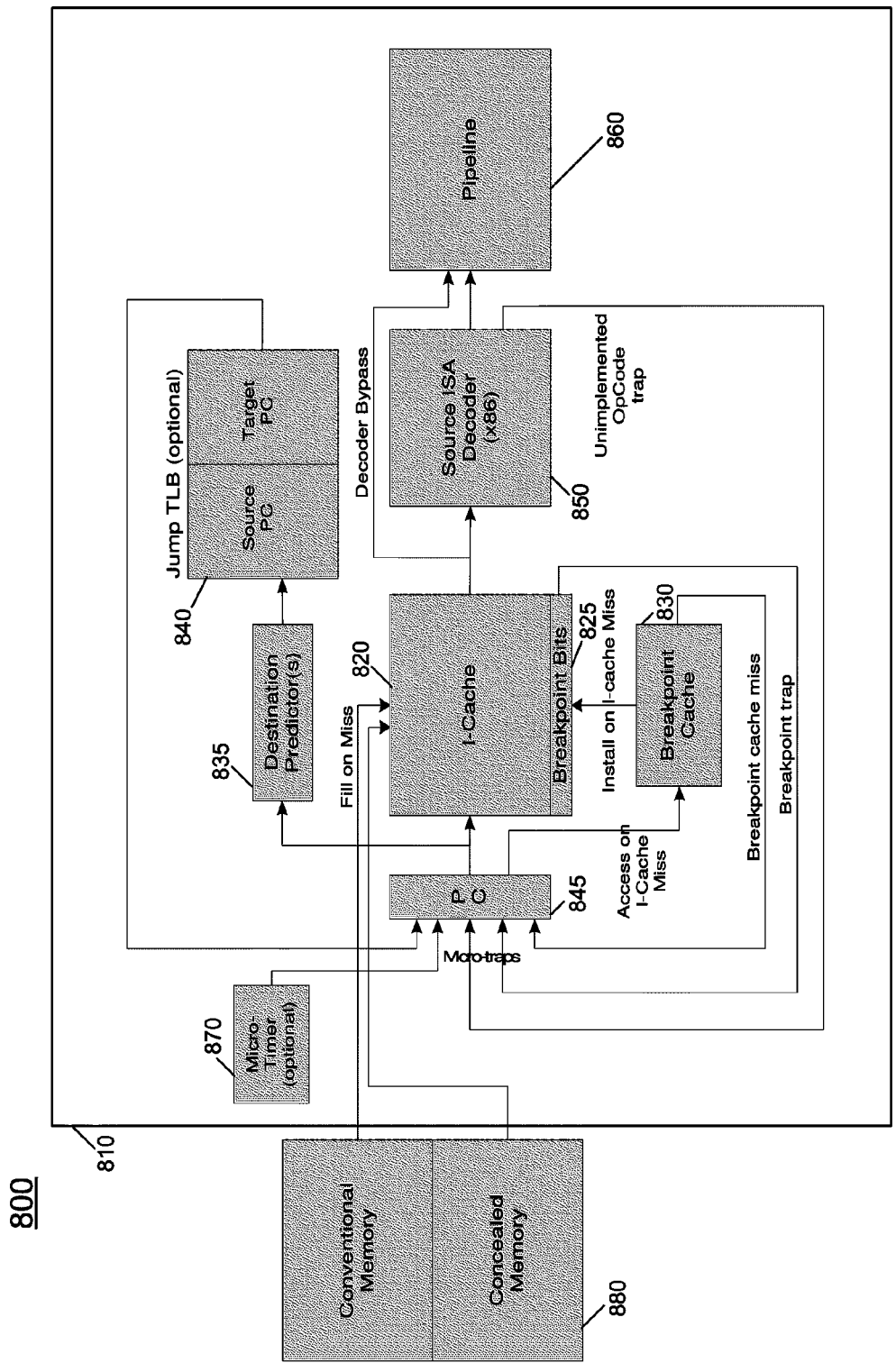
FIG. 9 is a block diagram of a processor in accordance with another embodiment of the present invention.

Referring now to FIG. 9, shown is a block diagram of a processor in accordance with another embodiment of the present invention. As shown in FIG. 9, processor 810 may include various components to enable partial translation. As seen, a program counter 845 may receive inputs from various locations and provide a corresponding program counter value to an instruction cache 820 which may include breakpoint bits 825 in accordance with an embodiment of the present invention. In other embodiments, the breakpoint bits may not be stored in an instruction cache. When present, instructions accessed may be provided to a source ISA decoder 850 when in direct mode. In the embodiment shown, a bypass path around decoder 850 may be provided to avoid decode where target ISA instructions are at the uop level. Accordingly, in either event uop instructions may be provided to a processor pipeline 860 which may include various stages including execution units and so forth to perform requested instructions.

As further seen in FIG. 9, a destination predictor 835 may provide predictions to a jump TLB 840. Similarly, on an instruction cache miss, a breakpoint cache 830 may be accessed to install a breakpoint bit for a newly inserted line. Also, a micro-timer 870 may also be coupled to program counter 845. As further seen, incoming instructions may be provided either directly from a conventional memory portion or a concealed memory portion of a system memory 880 depending on whether execution is in direct or emulation execution mode.

Micro-timer 870 may be used to identify hotspot regions for implementing dynamic optimizations on general source ISA code (not just for ISA extensions). Jump TLB 840 may work with the breakpoint bits to streamline instruction transfers from conventional to concealed memory. In different embodiments, jump TLB 840 can be indexed with either a branch destination address (from the pipeline) or a jump indirect address (from a register). Either the taken or not-taken address from a branch may be used. Breakpoint cache 830 can be filled from a breakpoint table via the emulation engine. In turn, breakpoint bits 825 may map 1-to-1 with the instruction cache lines. These bits are installed by hardware when the corresponding line is placed in instruction cache 820. They are then accessed on instruction fetches and trigger a breakpoint micro-trap, as required. In an implementation in which breakpoint bits are not installed in the instruction cache, the breakpoint trap can come from breakpoint cache 830. In one embodiment, micro-timer 870 can be loaded by the emulation engine and decrements every cycle.

Figure 10:
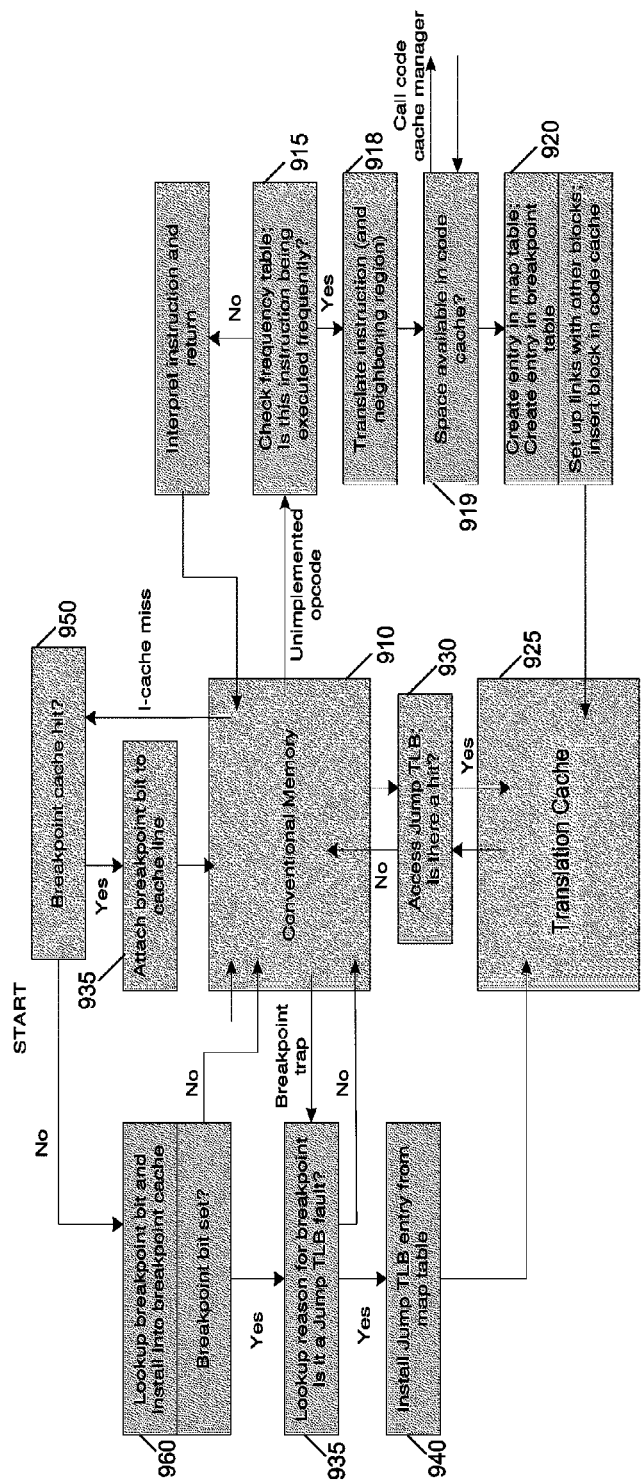
FIG. 10 is a flow diagram of operation of an emulation engine in accordance with one embodiment of the present invention.

Referring now to FIG. 10, shown is a flow diagram of operation of an emulation engine in accordance with one embodiment of the present invention. In this embodiment, the emulation engine may handle extended ISAs, and thus it manages both the breakpoint bits and the jump TLB. An emulation manager is first put in control at boot time to establish various tables and other structures it needs, and then it jumps to boot code. The boot code begins with direct execution (START in FIG. 10). Direct execution continues from conventional memory 910 until an unimplemented instruction is encountered (presumably due to the ISA extension.) At that point, there is a micro-trap to the emulation engine at block 915.

The emulation engine keeps a software table that tracks the frequency of specific unimplemented instructions. When it finds that such an instruction occurs frequently, it translates and optimizes the instruction (and other instructions in the same region) (block 918). This translated block is then installed in the code cache when space is available (blocks 919 and 970), and the map table and breakpoint table are updated to reflect the new block of translation(s). Then the emulation engine jumps to the translated block in the code cache and execution resumes with translated code (block 925).

When executing from the code cache, a branch or jump can have a destination address that is either in conventional memory or in the code cache. If it is in the code cache, then the transfer of control simply takes place. If the destination address is in conventional memory, the jump TLB is accessed (block 930). If there is a hit, then control is transferred back into the code cache, otherwise, control is transferred to the destination address in the conventional memory (back to block 910).

While executing from conventional memory, if there is a jump or branch whose destination address hits in the jump TLB, then transfer of control goes to the appropriate location in the code cache. If there is a breakpoint micro-trap to the emulation engine (i.e., a line is fetched with its breakpoint bit set and there is a jump TLB miss (block 935)) then the emulation engine installs the jump TLB entry from the map table if it exists (block 940), and continues at the target code address (block 935). On the other hand if there is no map table entry, then control is transferred back into the conventional memory (block 910)) This case can occur if there is more than one branch/jump into the cache line, but not all of them have entry points corresponding translations.

Finally, if there is an instruction cache miss, the breakpoint cache is accessed for the missed line (block 950), and if there is a hit, the breakpoint bit is "attached" to the newly installed cache line (block 955). Note that in some implementations, the breakpoint bit may not be installed with this cache line. If there is a miss, then there is a micro-trap into the emulation engine. The emulation engine then updates the breakpoint cache from the breakpoint table, if there is an entry in the breakpoint table (block 960). Otherwise, it creates a breakpoint table entry and sets it to zero (actually, an entire sector of bits is set to all zeros.) At that time, the jump TLB can also be updated if the breakpoint bit is set. An alternative, not shown, is to return to the conventional memory and re-try the instruction fetch that triggered the initial cache miss; at that point there will be a breakpoint micro-trap if there is a jump TLB miss, and the jump TLB will be updated at that time. While shown with this particular embodiment in the implementation of FIG. 10, understand the scope of the present invention is not limited in this regard.

Figure 11:
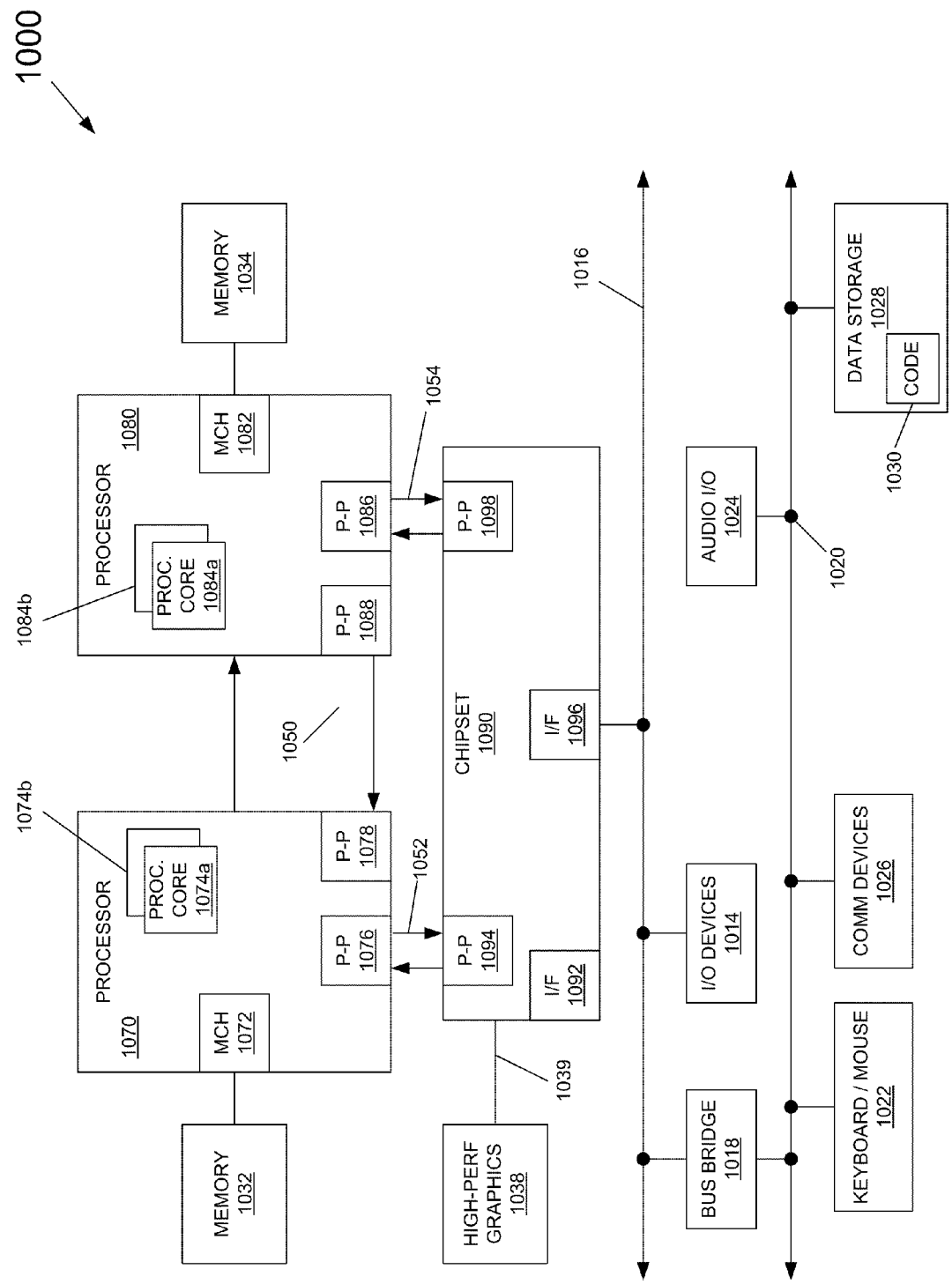
FIG. 11 is a block diagram of a system in accordance with an embodiment of the present invention.

Embodiments may be implemented in many different system types. Referring now to FIG. 11, shown is a block diagram of a system in accordance with an embodiment of the present invention. As shown in FIG. 11, multiprocessor system 1000 is a point-to-point interconnect system, and includes a first processor 1070 and a second processor 1080 coupled via a point-to-point interconnect 1050. As shown in FIG. 11, each of processors 1070 and 1080 may be multicore processors, including first and second processor cores (i.e., processor cores 1074*a* and 1074*b* and processor cores 1084*a* and 1084*b*), although potentially many more cores may be present in the processors. The processor cores may implement a partial emulation model such that at least some translated code can be executed to improve performance and/or to handle instructions that are not supported by the micro-architecture of the cores.

Still referring to FIG. 11, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 11, MCH's 1072 and 1082 couple the processors to respective memories, namely a memory 1032 and a memory 1034, which may be portions of main memory (e.g., a dynamic random access memory (DRAM)) locally attached to the respective processors. First processor 1070 and second processor 1080 may be coupled to a chipset 1090 via P-P interconnects 1052 and 1054, respectively. As shown in FIG. 11, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 11, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a disk drive or other mass storage device which may include code 1030, in one embodiment. Further, an audio I/O 1024 may be coupled to second bus 1020.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
    a processor pipeline including a plurality of execution units to execute instructions;
    a breakpoint cache coupled to the processor pipeline including a plurality of entries each to store an emulation indicator to indicate if at least one of a set of instructions stored in an instruction storage corresponding to the entry is associated with translated code stored in a translation cache;
    a map cache including a plurality of entries each to store a mapping between a location of a source instruction set architecture (ISA) instruction and a location for translated code stored in the translation cache for the source ISA instruction; and
    logic coupled to the breakpoint cache and the map cache to determine whether to cause a jump of control of the apparatus from a direct execution mode to an emulation execution mode based on at least one of a corresponding emulation indicator in the breakpoint cache and a mapping in the map cache.

2. The apparatus of claim 1, wherein the apparatus is to access a breakpoint table that stores emulation indicators for the set of instructions stored in the instruction storage if a control transfer instruction does not include an entry in the breakpoint cache.

3. The apparatus of claim 2, further comprising an instruction cache coupled to the breakpoint cache, wherein the apparatus is to store an emulation indicator from the breakpoint cache into a corresponding entry of the instruction cache when an instruction is written into the instruction cache.

4. The apparatus of claim 3, wherein if the control transfer instruction does not include a corresponding entry in the map cache, an emulation engine is to access a map table stored in a concealed memory to obtain the mapping and to store the mapping in an entry of the map cache.

5. The apparatus of claim 4, further comprising an instruction decoder coupled between the instruction cache and an execution unit, and a bypass path coupled between the instruction cache and the execution unit to provide instructions directly to the execution unit in the emulation execution mode.

6. The apparatus of claim 1, wherein the apparatus comprises a processor and the logic is to access the breakpoint cache responsive to a jump instruction.

7. The apparatus of claim 6, wherein the processor is to use the emulation execution mode to execute an instruction of an ISA for which micro-architecture hardware is not present in the processor.

8. The apparatus of claim 7, wherein the micro-architecture hardware of the processor is of a second ISA different than the ISA.

9. The apparatus of claim 6, wherein the processor is a hardware/software co-design processor to operate according to a partial emulation model.

10. The apparatus of claim 6, wherein the processor includes first micro-architecture hardware to perform a first set of instructions of an ISA and does not include micro-architecture hardware to perform at least one second instruction corresponding to an extension of the ISA.

11. The apparatus of claim 10, wherein the translation cache includes code to perform the at least one second instruction.

12. A method comprising:
accessing an entry of a first storage of a processor to determine if a memory segment associated with an instruction pointer includes code controlled by an emulation engine, including accessing a vector associated with the memory segment;
if so, using a value obtained from the instruction pointer to access an entry of a first table stored in a concealed memory including a plurality of entries each to store at least a portion of translated code; and
executing the translated code stored in the entry of the first table in an execution unit of the processor if the first table entry corresponds to the instruction pointer, and thereafter jumping to and executing additional translated code stored in a translation cache.

13. The method of claim 12, further comprising performing an in-line check using information in the first table entry to determine if the entry corresponds to the instruction pointer.

14. The method of claim 13, further comprising, if the first table entry does not correspond to the instruction pointer:
transferring control to the emulation engine to determine a location of translated code associated with the instruction pointer; and
obtaining an address for the translated code in the translation cache, and executing the translated code in the execution unit of the processor.

15. The method of claim 12, wherein the processor is a hardware/software co-design processor to operate according to a partial emulation model.

16. The method of claim 12, further comprising accessing a user-visible portion of system memory to obtain executable code for the instruction pointer if the portion of the memory segment corresponding to the instruction pointer does not include the emulation engine-controlled code.

17. The method of claim 12, further comprising setting a first indicator of the vector associated with the portion to indicate presence of the emulation engine-controlled code when the emulation engine-controlled code is stored in the translation cache.

18. The method of claim 12, further comprising accessing a translation table before accessing the first storage to determine if the instruction pointer is associated with an entry of the translation table, the translation table including a plurality of entries each to store an instruction pointer value and an address of a translation cache at which translated code for the instruction pointer value is to begin.

19. The method of claim 18, further comprising accessing the first storage only if the instruction pointer value is not stored in any entry of the translation table.

20. A system comprising:
a processor including at least one execution unit to perform first instructions in a direct execution mode and to perform translated code generated by an emulation engine in an emulation execution mode for second instructions, wherein the processor includes hardware support for the first instructions and does not include hardware support for at least some of the second instructions, the processor further including a first cache having a plurality of entries each to store a breakpoint indicator to indicate if any location of a memory block is associated with translated code stored in a translation cache and a second cache including a plurality of entries each to store an address of the translation cache at which translated code corresponding to an input address is located; and
a dynamic random access memory (DRAM) coupled to the processor, wherein the first and second instructions are to remain unmodified in the DRAM.

21. The system of claim 20, wherein the processor further comprises a third cache including a plurality of entries each to store a vector having a plurality of bits each to indicate whether a corresponding subset of a memory block is associated with the translated code.

22. The system of claim 21, wherein the processor further comprises logic coupled to the first cache, the second cache, and the third cache to determine whether to cause a jump of processor control from the direct execution mode to the emulation execution mode based on at least one of a translation cache address from the second cache, a corresponding breakpoint indicator from the first cache, and a corresponding bit from the third cache.

23. The system of claim 20, wherein the processor further comprises an address hash generator to generate a hash of an address used to access the first cache and to access an entry in a hash table based on the hash to begin execution of translated code stored in the hash table entry.

24. The system of claim 20, wherein the processor is to use the emulation execution mode to execute an instruction of a different instruction set architecture (ISA) than an ISA of the processor.

* * * * *